(No Model.)
M. B. MILLS.
RAILWAY GATE.
No. 577,489.
Patented Feb. 23, 1897.
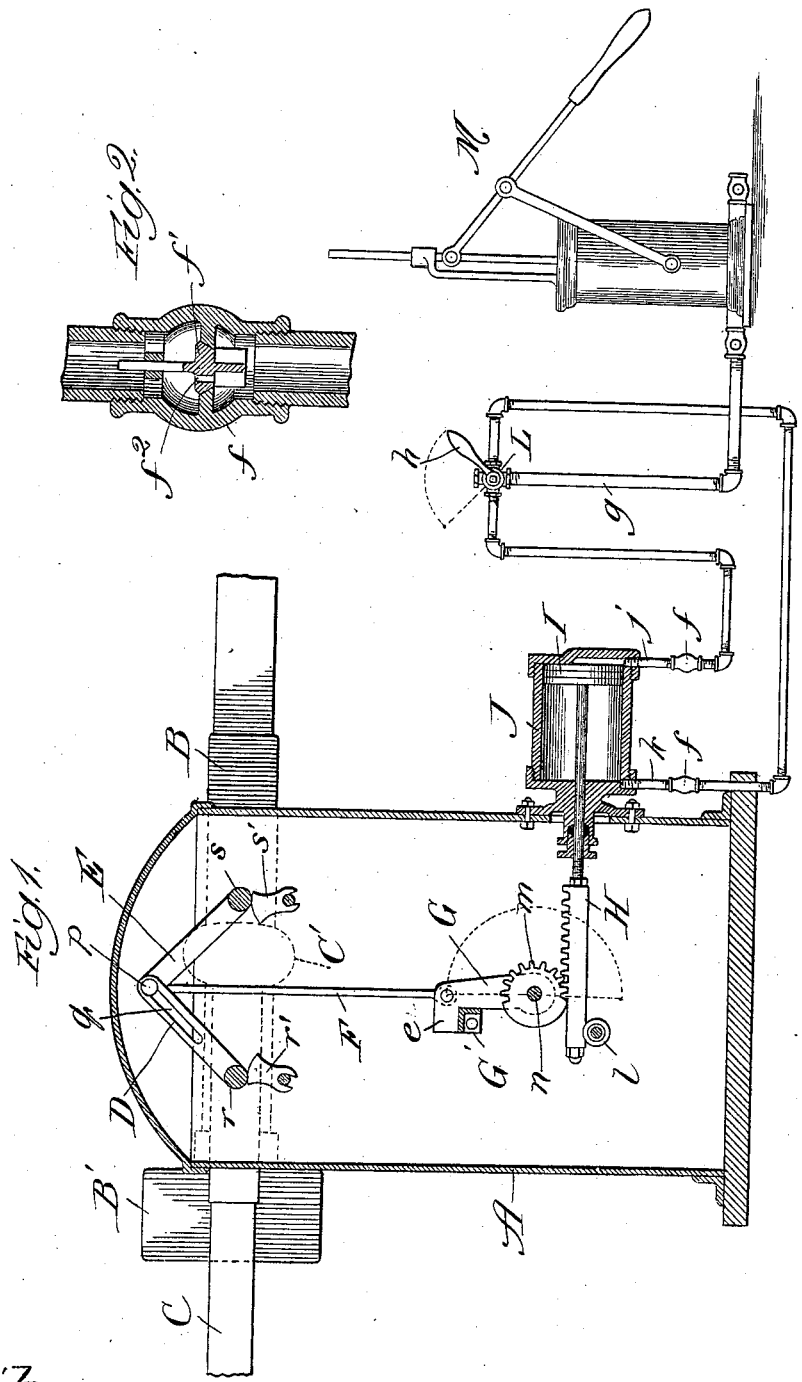
Witnesses:
Chas. E. Gaylord
Harry White
Inventor:
Mortimer B. Mills
By Dyrenforth & Dyrenforth,
Attys

UNITED STATES PATENT OFFICE.

MORTIMER B. MILLS, OF CHICAGO, ILLINOIS, ASSIGNOR TO THE MILLS PNEUMATIC GATE COMPANY, OF SAME PLACE.

RAILWAY-GATE.

SPECIFICATION forming part of Letters Patent No. 577,489, dated February 23, 1897.

Application filed December 23, 1895. Renewed January 23, 1897. Serial No. 620,489. (No model.)

*To all whom it may concern:*

Be it known that I, MORTIMER B. MILLS, a citizen of the United States, residing at Chicago, in the county of Cook and State of Illinois, have invented a new and useful Improvement in Railway-Gates, of which the following is a specification.

My invention relates to an improvement in pneumatic gates adapted for use at railway-crossings, and preferably of the type having vertically-swinging arms which are lowered to form street and sidewalk barriers.

My object is to provide actuating mechanism which shall be at once extremely simple in construction and perfectly adapted to its purpose.

To the above ends my invention consists in certain novel features of construction and combinations of parts hereinafter described, and particularly pointed out in the appended claims.

Broadly stated, my invention consists in a double-acting piston moving in a cylinder having near each end a compressed-air-supply pipe in communication with a source of supply, here shown as an air-pump; a rack connected with and actuated by the piston; a segmental pinion rocked back and forth through a desired arc by said rack, and means connected with the pinion for operating the gate-arms.

In the accompanying drawings, Figure 1 is a broken view, partly in section and diagrammatic in its nature, of a railway-gate and its operating mechanism embodying my invention; and Fig. 2, an enlarged sectional view of the special valve device I prefer to employ to steady the movement of the piston used.

A represents a gate-post upon which are mounted a street-barrier arm B and a sidewalk-barrier arm C, provided with counterweights B' and C', respectively. The arm B is rigidly attached to a shaft $s$, which is here shown provided with antifriction-bearings $s'$. The arm C is similarly fixed to a shaft $r$, provided with bearings $r'$. Fixed to the shaft $r$ is an arm or lever D, provided toward its free end with a slot $q$, and fixed to the shaft $s$ is an arm or lever E. The levers D and E are of such a length that they meet at a certain distance above their points of attachment to the shafts. A pin $p$ on the end of the lever E passes through and slides in the slot $q$ in the lever D, and pivotally connected at its upper end to the said pin is a connecting-rod F, pivoted at its lower end to the free end of a rocking arm G. The arm G is rigidly attached to a shaft $n$, journaled in the post, upon which is fixed a segmental pinion $m$. Meshing with the pinion $m$ is a rack H, which bears toward one end on a roller or sheave $l$, and is attached at the other end to the stem of a piston I, which moves in a cylinder J. Extending to opposite ends of the cylinder J are pipes $k$ and $j$, respectively, which are joined to a common supply-pipe $g$ by a four-way cock L. The cock L is provided with an operating-handle $h$, which may be turned to throw the supply-pipe $g$ into communication with either the pipe $k$ or $j$ and to open the pipes $k$ and $j$ alternately to the atmosphere. Interposed in the pipes $k$ and $j$ are valves $f$. (Shown in detail in Fig. 2.) The valves proper, $f'$, are provided with small perforations $f^2$ and seat in the direction away from the cylinder J, whereby air entering the cylinder J through either of the pipes $k$ or $j$ will unseat the respective valve $f'$ and pass freely through the valve device $f$, while in the retrogression of air from the cylinder the valve is seated, with the result of causing the air to escape slowly through the perforation $f^2$. The pipe $g$ connects with a compressed-air supplier, which may be the pump M shown.

The drawings show the barrier-arms in their lowered position. In operation to raise the said arms the handle $h$ is turned to open communication between the pipes $g$ and $j$ and between the pipe $k$ and the external atmosphere. The pump M is then actuated to force air through the pipe $j$ and move the piston I toward the pinion $m$, whereby the arm G is rocked downward, drawing down the levers D and E and lifting the barrier-arms B and C.

As the air escapes from the exhausting end of the cylinder through the pipe $k$ it seats the respective valve $f'$, so that the air is forced through the small opening $f^2$ and produces an air-cushion, which tends to retard and thus regulate the movement of the piston. To lower the barrier-arms, the handle $h$ is turned to connect the pipe $k$ with the supply-pipe $g$ and the pipe $j$ with the external atmosphere. The arm G is shown of such length as to require a revolution through one hundred and eighty degrees to rock the gate-arms through the required ninety degrees. This would of course be the arrangement for greatest efficiency in utilizing power and is the method adopted. The arm G is provided at its free-end portion with an offset $e$, which, when the gate-arms are lowered, rests upon the stop G'. The offset $e$ impacts against the stop G' a little in advance of the movement of the piston to the end of the cylinder, so that the piston is relieved from any shock under the force of the gate-arms when they drop to their lowered position. When the gate-arms are in the lowered position shown, the arm G, as it rests against the stop G', is slightly beyond the dead-center. This prevents the possibility of the barriers being raised by unauthorized parties, as upward pressure against the arms will only force the offset $e$ more firmly against the stop G'. By causing the arm G to move slightly beyond the dead-center when the barriers are raised to the vertical plane and to rest against the stop $l$ the barrier-arms are firmly locked in their raised position against movement under the action of the wind.

It has been my aim in producing the gate shown and described to provide a construction which would be eminently effective and durable and perform all the requirements of gates of this character with as few parts as possible. The initial cost of railway-gates and the expenses necessary to keep them in repair are an important item to railways, so that in providing a gate which is in every way as easy to handle and as effective in operation as any other gate, but which in its operating mechanism contains fewer parts, all of which are of a construction rendering them especially durable and unlikely to get out of order, I have produced a desirable and important improvement in the art.

What I claim as new, and desire to secure by Letters Patent, is—

1. The combination with a gate-post, and a barrier-arm journaled thereon, of a cylinder, a piston therein, a rack connected with and actuated by said piston, a pinion mounted in the gate-post and engaging the said rack, a crank in rigid relation to and movable with the said pinion, a link connection between the said crank and barrier-arm, stops in the path of the said crank at points adjacent to but beyond the dead-center of the crank with relation to the link connection in the movement of the crank to the opposite ends of its traverse, and compressed-air supplying and exhausting means at the cylinder for reciprocating the piston, substantially as and for the purpose set forth.

2. The combination with a gate-post, and barrier-arms B and C journaled thereon, of a lever E on the arm B, a lever D on the arm C, a pin-and-slot connection between the said levers, an operating-rod pivoted at the said pin connection, a cylinder, a piston in the cylinder, a reciprocating rack connected with and operated by the piston, a pinion mounted in the post and engaging said rack, a crank upon and movable with the pinion and pivotally connected at its free end portion with the said operating-rod, and compressed-air supplying and exhausting means at the cylinder for reciprocating the piston, substantially as and for the purpose set forth.

MORTIMER B. MILLS.

In presence of—
J. N. HANSON,
J. H. LEE.